United States Patent [19]

Higgins

[11] 4,175,722
[45] Nov. 27, 1979

[54] CONTROL SYSTEM FOR RAM AIR GLIDING PARACHUTE

[76] Inventor: Michael W. Higgins, 6431 Oakhurst Pl., Dayton, Ohio 45414

[21] Appl. No.: 891,877

[22] Filed: Mar. 30, 1978

[51] Int. Cl.² ............... B64D 19/00; B64D 17/02; B64D 17/18
[52] U.S. Cl. ............................. 244/152; 244/145; 244/DIG. 1
[58] Field of Search ......... 244/152, 145, 142, DIG. 1

[56] References Cited

U.S. PATENT DOCUMENTS 2,404,659  7/1946  Rohulick ..................... 244/152 X
3,822,844  7/1974  Sutton ......................... 244/145

FOREIGN PATENT DOCUMENTS 278613  10/1930  Italy ............................. 244/152

Primary Examiner—Barry L. Kelmachter
Attorney, Agent, or Firm—Joseph E. Rusz; Richard J. Killoren

[57] ABSTRACT

A system for inducing turns in ram air canopy parachutes having a plurality of openings in the upper surface layer of the parachute canopy with the openings being equally distributed on opposite sides of the parachute centerline. Flaps are provided on the under side of the upper surface layer to close the openings. Control lines are attached to the flaps for selectively opening the flaps on one or the other side of the centerline to allow ram air to flow through the openings. This reduces lift and increases drag on one side of the ram air canopy parachute to induce a turn.

2 Claims, 3 Drawing Figures

CONTROL SYSTEM FOR RAM AIR GLIDING PARACHUTE

RIGHTS OF THE GOVERNMENT

The invention described herein may be manufactured and used by or for the Government of the United States for all governmental purposes without the payment of any royalty.

BACKGROUND OF THE INVENTION

This invention relates to a ram air canopy parachute system as shown in the patents to Jalbert, U.S. Pat. Nos. 3,749,337; Sutton, 3,893,641; and Womble et al, 4,015,801.

With conventional type parachutes, closable vents have been used to aid in steering the parachutes. The patents to Hovak et al, 2,393,634 and Basnett, 3,343,769 show two such systems. The patent to Womble et al discloses the use of movable control surfaces to provide left or right turns of the ram air parachute.

In the recovery of remotely piloted vehicles and the aerial delivery of cargo, large control forces and control deflections are needed to provide turns in ram air gliding parachutes. Some system is needed for reducing the control forces and deflections needed to produce turns in ram air gliding parachutes if they are to be useful RPV recovery and cargo delivery systems.

BRIEF SUMMARY OF THE INVENTION

According to this invention, porous areas are provided in the upper surface on opposite sides of the centerline of a ram air gliding parachute. The porous areas are located in the region of maximum lift of the gliding parachute. Flaps of nonporous material are provided inside the parachute underneath the areas of porous material. Control lines are secured to the trailing edge of the flaps. When a control line is pulled, ram air pressure forces air through the porous material which disturbs the flow over one side of the gliding parachute. This reduces lift and increases drag and thus reduces the lift to drag ratio on that side of the parachute thus inducing a turn. The flaps can be moved with much less force and with a much shorter stroke than is needed to move the entire trailing edge of the canopy on one or the other side of the canopy centerline.

IN THE DRAWINGS

DETAILED DESCRIPTION OF THE INVENTION

Figure 1:
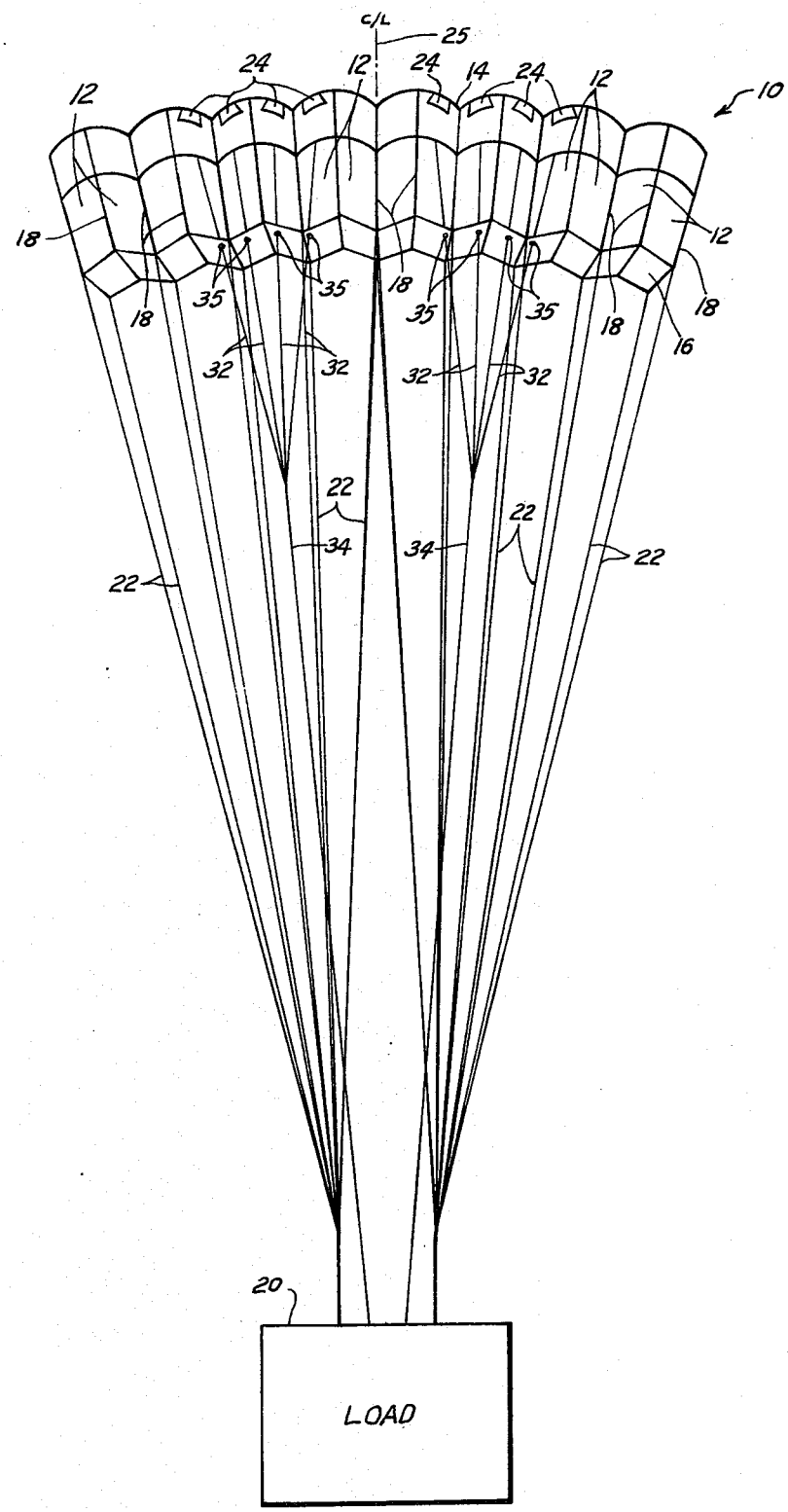
FIG. 1 is a schematic front view of a ram air parachute according to the invention.

Reference is now made to FIG. 1 of the drawing which shows a ram air parachute 10 having an airfoil shape and a plurality of partially closed channels 12 formed between an upper nonporous fabric layer 14 and a lower nonporous fabric layer 16 with a plurality of panels 18 being secured to the upper and lower fabric layers for dividing the space between the upper and lower layers into said partially closed channels with openings 19 at the forward end of the canopy. The upper and lower layers, divider panels and flaps may be made of low porosity fabric such as 1.5 oz/yd² calendered or coated cloth. Conventional interconnecting passages, not shown, may be provided in the divider panels 18.

The ram air parachute is connected to load 20 with conventional suspension lines 22. The suspension lines can be connected to the parachute in any conventional manner.

The configuration of the parachute thus far described can be like that of any of the known ram air gliding parachutes.

Figure 3:
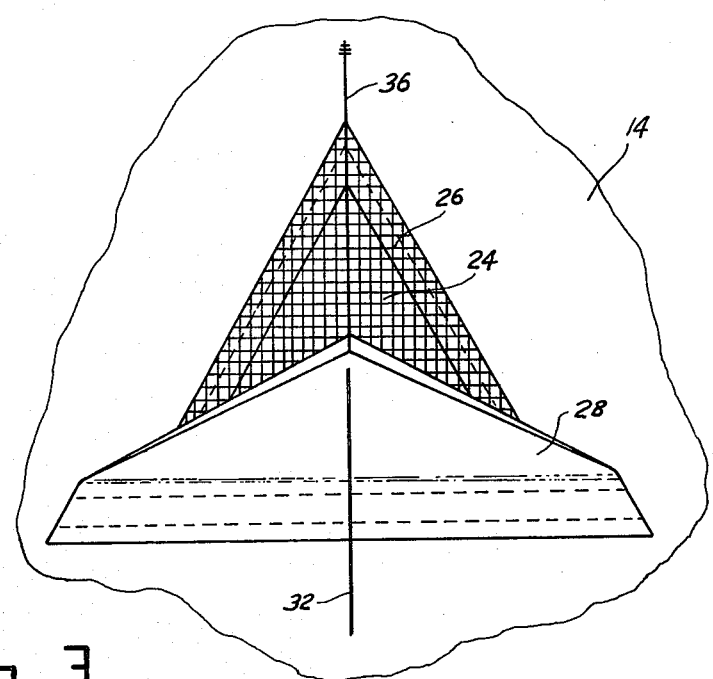
FIG. 3 is a bottom view of one of the turn control elements of the device of FIG. 1.
Figure 2:
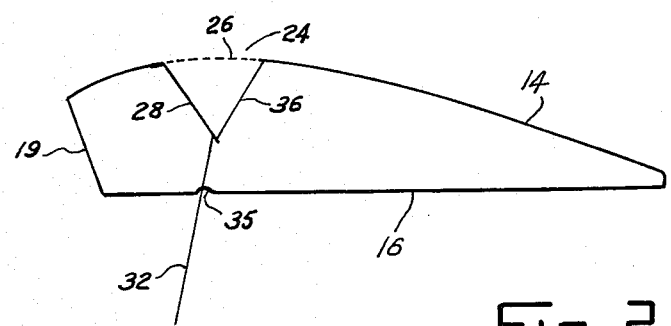
FIG. 2 is a schematic side view showing one of the turn control elements used in the device of FIG. 1.

The ram air parachute is modified according to this invention by providing a plurality of triangular shaped openings 24 in the upper layer 14 in certain selected channels 12. An equal number of openings 24 are provided on opposite sides of centerline 25 which is a line passing through the center of the canopy and the center of the load. The openings 24 are covered with a porous layer of material 26, as shown in FIG. 3. A material such as nylon marquisette cloth Mil-C-26643 can be used for covering the openings. A plurality of triangular shaped flaps 28 of nonporous material are secured to the inner surface of layer 14 on the ram air inlet side of openings 24. The flaps 28 are made larger than openings 24 to provide a good seal. A control line 32 is connected to each flap 28, as shown in FIGS. 2 and 3, and to an operating line 34. The control lines pass through grommets 35 in the lower layer 16. Two operating lines 34 are provided with all the control lines on one side of the centerline being connected to one operating line. The operating lines 34 would be operated by personnel using the gliding parachute or by remote control or a preprogrammed sequencer, not shown, when cargo loads are connected to the parachute.

To assure closing of the openings 24, when desired, a resilient return line 36, such as an elastic strip, is secured between the flaps 28 and the layer 14. The flaps are closed and held closed by ram air within channels 12, with the elastic strips 36 acting to keep the flaps from becoming skewed.

In the operation of the parachute turn control system, in normal flight, the channels 12 are filled with ram air and the parachute is operating with normal lift.

When a turn is desired the flaps on one side of the centerline 25 are opened by operation of one of the operating lines 34. This draws down on control lines 32 to open flaps 28. When flaps 28 are opened ram air pressure in channels 12 force air through openings 24. Thus air flowing through openings 24 disturbs the flow over the surface of layer 14. This reduces lift and increases drag on one side of the centerline which induces a turn in the parachute. The openings can be located anywhere forward of the line of flow separation or in the normal lift portion of the parachute. However, for maximum efficiency the openings should be located in the area of maximum lift or area of maximum thickness of the airfoil canopy.

There is thus provided a ram air canopy parachute turn control system which reduces the control forces and stroke needed to produce turns in ram air gliding parachutes.

I claim:

1. In combination with a ram air parachute for supporting a load and having an airfoil shaped canopy with a first fabric layer forming the upper surface of the airfoil shaped canopy and a second fabric layer spaced from the first layer and forming the bottom surface of the airfoil shaped canopy; a plurality of fabric layers interconnecting the first fabric layer and the second fabric layer and dividing the space between the first and second fabric layers into a plurality of channels with the number of channels on one side of a centerline passing through the center of the canopy and the center of the load being equal to the number of channels on the other side of said centerline; said channels being closed at the rearward end of the canopy and having ram air inlets at the forward end of the canopy; a system for inducing turning moments in said canopy, comprising: means, in the upper surface of said canopy, for selectively reducing the lift to drag ratio of said canopy on one side of said centerline and means, in the upper surface of said canopy, for selectively reducing the lift to drag ratio of the upper surface of the canopy on the other side of said centerline; said means for selectively decreasing the lift to drag ratio on the upper surface of the airfoil on one side and the other side of said centerline including means for providing a plurality of first porous areas in the upper surface of said canopy on one side of said centerline and a plurality of second porous areas in the upper surface of said canopy on the other side of said centerline; non-porous closure elements within said channels for covering said porous areas; means for holding said closure elements over said porous areas; means for selectively opening the closure elements on one side of said centerline and means for selectively opening the closure element on the other side of said centerline; said closure elements comprise a plurality of flap elements secured to the bottom surface of said first fabric layer adjacent the porous areas and on the ram air inlets side of the porous areas; said means for holding the closure elements over said porous areas including resilient means secured to said flap elements and to the first fabric layer on the side of said porous areas remote from said ram air inlets; said means for selectively opening the closure elements including a plurality of control lines passing through the second fabric layer, with each of the control lines having one end attached to one of said flap elements adjacent the position where the resilient means are secured.

2. The device as recited in claim 1 wherein said means for providing porous areas in the upper surface of the canopy include porous fabric positioned approximately in the area of maximum lift of said airfoil.

* * * * *